United States Patent
Park et al.

(10) Patent No.: US 6,589,474 B1
(45) Date of Patent: Jul. 8, 2003

(54) ONE-BODY HORIZONTAL CONTINUOUS CASTING APPARATUS AND METHODS OF DEOXIDATION, AND REFINING OF PHOSPHORIZED COPPER USING SAID APPARATUS

(75) Inventors: Won Wook Park, Changwon-shi (KR); Tae Gi Ha, Taikukwangyok-shi (KR); Bong Sun You, Kyungnam (KR); Ha Sik Kim, Kyungnam (KR); Hi Tack Bae, Taikukwangyok-shi (KR)

(73) Assignee: Korea Institute of Machinery and Materials, Kyungnam (KR)

( * ) Notice: Subject to any disclaimer, the term of this patent is extended or adjusted under 35 U.S.C. 154(b) by 21 days.

(21) Appl. No.: 09/696,318

(22) Filed: Oct. 25, 2000

Related U.S. Application Data

(63) Continuation of application No. 09/605,315, filed on Jun. 28, 2000, now abandoned.

(30) Foreign Application Priority Data

Jun. 28, 1999 (KR) .............................. 99-24570

(51) Int. Cl.$^7$ ................................. C21B 3/04
(52) U.S. Cl. ...................... 266/229; 266/236; 164/443; 164/437
(58) Field of Search ................. 164/440, 443, 164/437, 439, 138, 435; 266/227, 229, 217, 236, 275

(56) References Cited

U.S. PATENT DOCUMENTS

| | | | |
|---|---|---|---|
| 4,436,143 A | | 3/1984 | Sevastakis |
| 4,802,436 A | | 2/1989 | Wilson et al. |
| 5,027,881 A | * | 7/1991 | Horst et al. ................. 164/443 |

OTHER PUBLICATIONS

Haissig, *Horizontal continuous casting: A technology for the future*, Iron & Steel Engineer, Jun. 1984; pp. 65–71.
Emley, *Continuous casting of aluminum*, International Metals Reviews, Jun. 1976, pp. 75–115.
Calvert et al., *Horizontal continuous and semi–continuous casting developments*, Wire Journal, May 1980, pp. 116–120.
Powers, *The Alcoa Horizontal Continuous Casting Process*, Light Metal Age, Dec. 1975, 3 pages.

\* cited by examiner

*Primary Examiner*—Scott Kastler
(74) *Attorney, Agent, or Firm*—Thompson Coburn LLP

(57) ABSTRACT

The present invention relates to a one-body continuous casting apparatus for fabricating a rod or slab shape of phosphorized copper by means of using a horizontal continuous casting process. Such invention contemplates designing and manufacturing a one-body melting and casting machine using high or low frequency induction heating, wherein a molten metal is deoxidized and refined in the system which comprises installing the multistage graphite filters inside the melting and casting machine, so the procedure of transferring the molten metal from the melting furnace to the casting machine can be eliminated, thereby enabling the horizontal continuous casting apparatus to manufacture a phosphorized copper of high quality. Furthermore, the present invention encompasses a technique of solidifying the molten metal quickly by using a cooling system with a rapid cooling capability to manufacture small diameter rods of phosphorized copper of 30~60 mmΦ either with the least or without the additional treatment processes. Therefore, the apparatus saves the trouble of having to go through the traditional treatment process such as billet extrusion, yet manufactures the phosphorized copper rods directly from the apparatus to save in terms of money and energy in manufacturing process and in apparatus construction.

4 Claims, 3 Drawing Sheets

ONE-BODY HORIZONTAL CONTINUOUS CASTING APPARATUS AND METHODS OF DEOXIDATION, AND REFINING OF PHOSPHORIZED COPPER USING SAID APPARATUS

This is a continuation of application Ser. No. 09/605,315; filed on Jun. 28, 2000, now abandoned.

TECHNICAL FIELD OF THE INVENTION

The present invention relates to an one-body horizontal continuous casting apparatus and the methods of deoxidation and refining for fabricating a slab, rod or tube shape materials directly from the molten phosphorized copper by means of using a horizontal continuous casting process. In order to incorporate the technology of the horizontal casting apparatus with multiple steps, the process of deoxidation and refining to the one-body melting and casting machine with a unitary melting furnace and casting machine, and to reduce the cost associated with the apparatus construction, the present invention contemplates designing and manufacturing an one-body melting and casting machine, wherein molten metal is deoxidized and refined in the one-body melting and casting machine which comprises multi-staged graphite filters and a system with a rapid cooling capability.

BACKGROUND OF THE INVENTION

Methods of continuous casting of a vertical, horizontal, or upward type have been employed until presently for production of high purity phosphorized copper for the purpose of plating, and the vacuum melting and casting method is used only for productions in small scale.

Of these methods for continuous casting, the vertical continuous casting process cannot provide a direct continuous casting of a small section in a near-net-shape. Thus, those of a large section have to undergo a vertical continuous casting in the first stage, after which, it is processed to form a slab, rod, or tube shape. Also, the upward continuous casting process cannot control the shape and the area of a section whereas the horizontal continuous casting process enables a direct continuous casting of the desired shape of a slab, rod, or tube.

Furthermore, the horizontal continuous casting process offers the advantage of continuous casting of highly purified molten metal without the fear of oxidation by receiving the molten metal directly from the lower part of the casting furnace. Thus, such process is suitable for producing phosphorized copper.

Despite of all these advantages, an one-body horizontal continuous casting apparatus for phosphorized copper and the production method thereof using the horizontal continuous casting process had not been fully developed due to the inadequacy in the technology of designing a unitary melting and casting machine and in the technology of a short term deoxidation process. Moreover, there are no relevant references for the particular details of the technology.

In order to fabricate a PCB(Printed Circuit Board) plating purpose phosphorized copper rod by means of a continuous casting process, it is necessary to develop various techniques, such as suppression of oxidation in the molten metal, deoxidation in a furnace for deoxidizing the oxygen contained therein, transferring of the molten metal from the melting furnace to the casting machine, suppression of oxidation of the molten metal during such transferring, secondary deoxidation and refining in the casting machine, production of fine microstructure through rapid cooling, cold and hot working, and the like.

Accordingly, these various techniques have had some problems in terms of productivity and simplification of the process. Furthermore, a unitary apparatus for a horizontal continuous casting machine of the conventional resistance heating type requires a long period of time for melting and holding the temperature, thus, making the prevention of inflow of oxygen difficult and the productivity low.

Moreover, the traditional method of production of large billets for an extrusion process encompasses the problems of: segregation of P, coarsening of the microstructure, decrease in productivity, increase in product cost, inability to produce a high quality PCB plating purpose phosphorized copper which requires minimal impurities, and inability to give the required physical and electrical properties.

It means that, until now, PCB plating purpose phosphorized copper is used in the form of a ball, slab, or nugget where the use of the method of production of large area billets through extrusion process resulted in the tremendous loss of energy and a costly spending for apparatus construction.

SUMMARY OF THE INVENTION

The present invention has been devised to remedy the aforementioned problems with respect to the continuous casting process of copper alloys. In order to produce oxygen-free copper or special alloys by means of using the horizontal continuous casting process, the conventional apparatus comprises a melting furnace, a casting machine, a runner connecting the melting furnace to the casting machine, a cooling system which is connected to the casting machine for solidifying the molten metal, and withdrawing rolls which pull out the cast product. However, the present invention provides a one-body melting and casting machine that is designed to utilize high frequency induction heating. More specifically, the present invention relates to the art of employing a system in which graphite flakes are applied onto the surface of the molten metal for the sake of deoxidation and refining of the molten metal. Wherein multi-staged graphite filters are installed inside the unitary melting and casting machine, and a pair of first and second bubblers which can blow in inert gas is inserted into molten metal through one of the graphite filters.

Moreover, by applying such technology as in the present invention, oxygen-free copper or special copper alloys of high quality can be manufactured with the horizontal continuous casting process by controlling the amount of oxygen or impurities. Also, the cooling system, which is designed to give a maximum cooling effect, enables the horizontal continuous casting machine to produce small diameter phosphorized copper rods with a very fine microstructure. Thus, an elimination or minimization of additional process can be achieved resulting in a simplified process of manufacturing phosphorized copper balls through cold or hot working.

This invention, by means of horizontal continuous casting process, can simplify the manufacturing process by directly producing small diameter phosphorized copper rods which are, then, cut to an appropriate length which, then again, are used to produce phosphorized copper balls or ovals that meet the required measurement as final products. As an example, in order to manufacture a phosphorized copper ball of 45 mmΦ, a rod of 32 mmΦ and 60 mm in length of same volume is required. Accordingly, this invention can cast a rod of 32 mmΦ and cut it at the length of 60 mm to yield the required material and; therefore, reducing the manufacturing cost.

BRIEF DESCRIPTION OF THE DRAWINGS

These and other features, aspects, and advantages of the present invention will become better understood with regard to the following description, appended claims, and accompanying drawings where:

FIG. 2 is a top view and a side view of the graphite filters, which are installed inside of the crucible of FIG. 1, and comprises the filters of:

Figure 1:
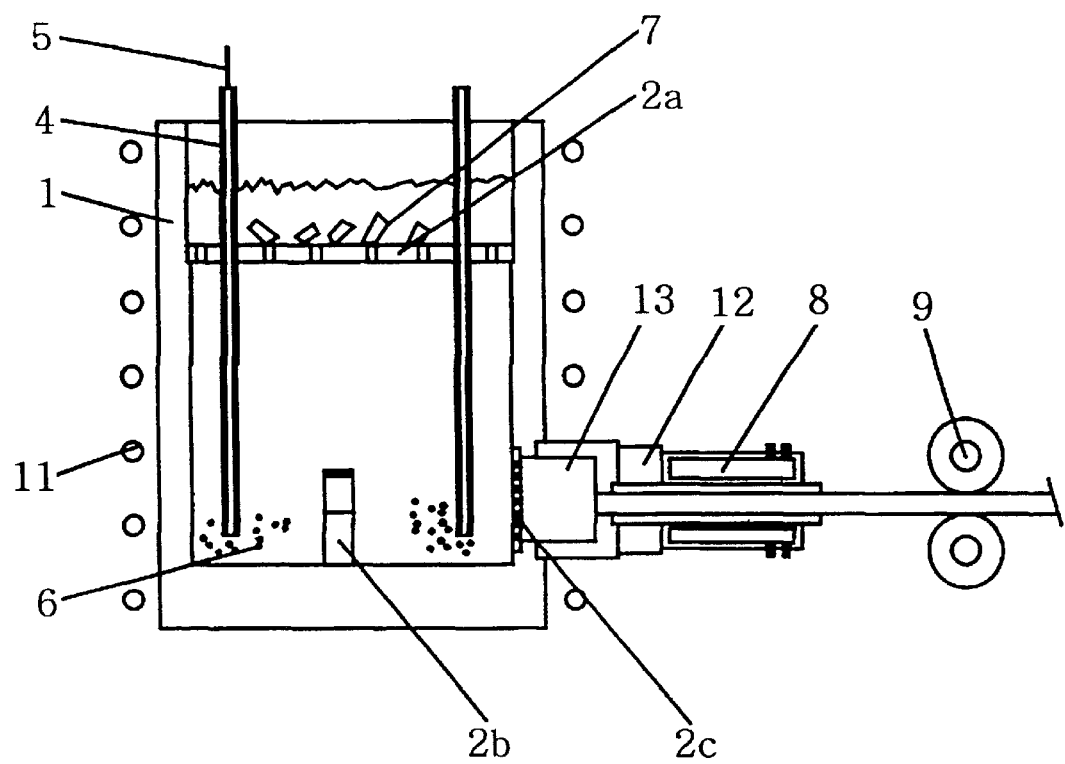
FIG. 1 is a vertical sectional view of the melting and casting machine of the one-body horizontal continuous casting apparatus according to the invention.
Figure 2:
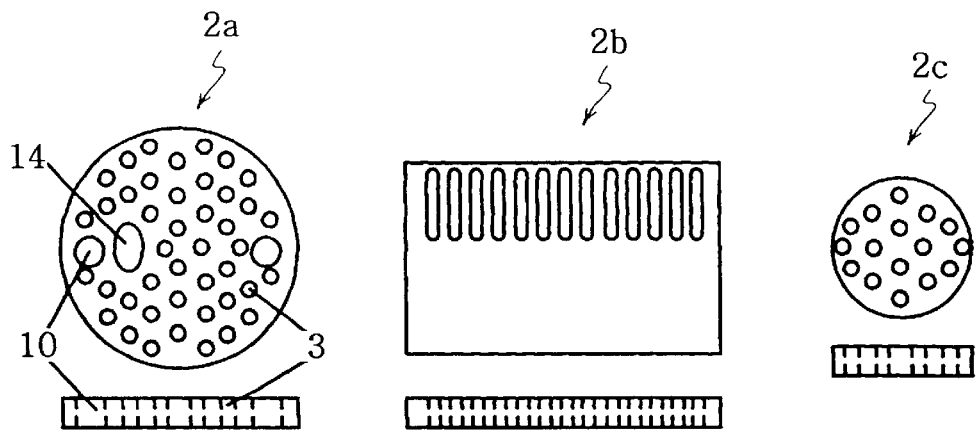
Figure 3:
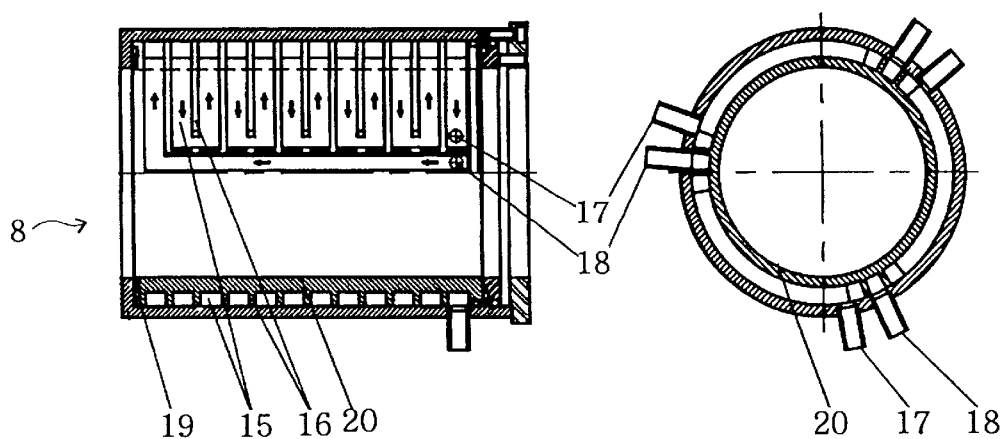
Figure 4:
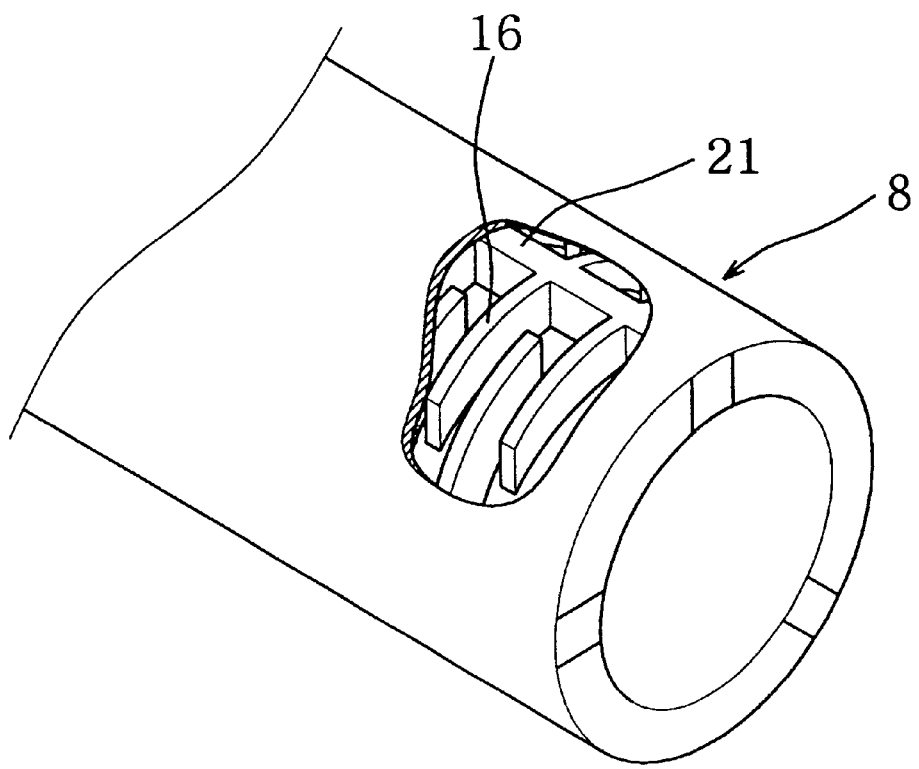

2a showing a filter dividing the crucible into an upper and lower portion;

2b showing a filter separating the charging part from other outflow vents, and 2c showing a discharging filter purifying the molten metal in the guide tube;

FIG. 3 is a top view and a vertical sectional view of the cooling system which solidifies the molten metal; and FIG. 4 is a partial sectional view of the cooling system of FIG. 3.

DESCRIPTION OF THE INVENTION

The one-body horizontal continuous casting apparatus of phosphorized copper and methods of deoxidation and refining using the present invention will be described in more detail as follows with references to the accompanying drawings.

As illustrated in FIGS. 1~4, with respect to the horizontal continuous casting apparatus, the present invention is characterized comprising: the graphite crucible 1 which smelts the electrolytic coppers 7 and additive elements by means of high-frequency or low-frequency induction heating by a heater 11; a graphite filter 2a, having a pipe hole, multiple outflow vents 3 for gas and for the molten metal, and a charging hole 14 for charging Cu-P master alloy into the lower portion of the crucible, which is installed inside of the crucible in such a way to divide the molten metal into the upper and lower portion; a graphite filter 2b, which is installed in the middle and at the lower portion of the crucible in such a way to divide the lower portion of the crucible into a charging side and an opposite side, for inducing deoxidation and reducing temperature differences between the charging side and the opposite side; the gas-bubbling pipe 4 made of graphite, which passes through the pipe hole 10 and is installed at the lower portion of the crucible 1, for blowing in inert gas through the gas supply line 5 installed at the interior thereof; the cooling system 8, which is attached to the crucible 1 at the lower portion thereof where the molten metal is discharged through the guide tube 13, for receiving the molten metal; the graphite filter 2c, which is placed within the guide tube 13, for increasing the degree of purity of the molten metal; the adiabatic material 12, which is attached between the cooling system 8 and the guide tube 13, for preventing heat transfer; and the withdrawing rolls 9, in which copper alloy passing through the cooling system 8 undergoes horizontal continuous casting.

With respect to the method of deoxidation and refining the molten metal, applying the same to the integrate horizontal continuous casting apparatus, the present invention is characterized in that:

Pure nitrogen gas is blown into the upper portion of the graphite crucible 1 to create a non-oxygen atmosphere therein; in case of high-frequency induction heating, the surface of the molten metal is covered with graphite flakes in a state of floatation, for preventing the inflow of oxygen; the molten metal passing through multiple outflow vents 3 on the multi-staged graphite filters 2a, 2b, and 2c is made to contact with the graphite filters 2a, 2b and 2c for deoxidation by means of reaction between the oxygen in the molten metal and the graphite; and the gas supply lines 5, which passes through the gas bubbling pipes 4 that are installed on both, left and right, side of the graphite filter 2a, constantly pumps in inert gas to the molten metal; and inert gas, which create gas bubbles while passing through the minute holes (not shown) punctured in the lower part of the gas bubbling pipes 4, traps the oxygen and impurities and floats to the surface.

Furthermore, with respect to the cooling system, the present invention is characterized in that:

The cooling fins 16, which are installed in the inside of the cooling system 8 and designed in lattice form, increase the cooling rate of phosphorized copper; coolant entrances 18 and exits 17 are installed in three different locations in the inside of the cooling system 8, which are separated by the partitions 21, for increasing the cooling rate; rubber and copper alloy rings 19, which are installed within the cooling system 8, for sealing the interior space of the cooling system 8 and preventing leakage of the coolant.

In order to manufacture a small diameter rod, a rapid cooling is required for increasing manufacturing speed and maintaining microstructural uniformity. As illustrated in FIG. 3 and FIG. 4, the cooling system 8 is separated into 3 cooling chambers 15 by the partitions 21 which allow more coolant to flow through each of the cooling chambers, and the fins 16 are designed so that coolant does not flow directly from the entrance to the exit, but to touch as much area as possible by making the coolant go through the cooling fins 16 that are set up in a way to cross one another and to travel in a spiral direction.

Also in order to compress the graphite mold, with the inner diameter of about 30~60 mmΦ, to the touching area of the interior surface of the cooling system 20, the graphite binder is used. Thus, phosphorized copper rods will be produced through a cooling system 8 that has a uniform cooling rate in the upper and lower portion thereof thanks to the graphite mold and the binder. The produced phosphorized copper rods can be cut into an appropriate size and used as it is in the form of a nugget or forged while still hot to produce phosphorized copper in the form of a ball.

Furthermore in regards to a forging process of the cast rod, the surface of the cold-forged ball has the tendency to become rough, but by applying pressure through the hydraulic press of a force at approximately 10 ton/cm$^2$, the roughness can be reduced. Furthermore, the phosphorized copper ball can be heat treated where a fair conditioned surface of the phosphorized copper ball can be produced through a heat treatment at approximately 700~800° C.

The apparatus and the method of the horizontal continuous casting of phosphorized copper by means of using a one-body high or low frequency melting and casting machine according to the present invention having the objectives and constitutions as above involves less apparatus construction costs as compared to the conventional continuous casting process. With the greater ease in quality control, the present invention simultaneously incorporates the use of a filter for effective deoxidation and refining of the molten metal, gas bubbling, and the use of graphite, with the effect of minimal turbulence of the molten metal, thereby minimizing the mixing with impurities.

Thus, the amount of oxygen therein can be kept at less than 5 ppm by virtue of the deoxidation and refining methods. As such, without having a separate melting furnace for deoxidation, phosphorized copper of high quality can be fabricated for 24 hours round-the-clock by the continuous casting process.

Furthermore, by producing small diameter rods through a rapid cooling method, the rods with fine microstructure can be obtained. Therefore, a complex process such as an extrusion process can be eliminated. Thereby allowing the direct production of phosphorized copper balls, increase in productivity, reduction in the production cost, and increase the physical and chemical property of PCB plating purpose anode materials.

What is claimed is:

1. A one-body horizontal continuous casting apparatus comprising:

(a) a graphite crucible for smelting electrolytic coppers and additive elements to thereby produce molten metal;

(b) a heater for heating the crucible by high-frequency or low-frequency induction heating;

(c) a first graphite filter disposed in the crucible to thereby define an upper portion of the crucible and a lower portion of the crucible, the first graphite filter having pipe holes, multiple outflow vents for gas and for the molten metal, and a charging hole for charging Cu-P master alloy into the crucible's lower portion;

(d) a second graphite filter disposed in the crucible's lower portion to thereby divide the crucible's lower portion into a charging side and an opposite side, the second graphite filter for inducing deoxidation and reducing temperature changes between the charging side and the opposite side;

(e) a gas-bubbling graphite pipe having a gas supply line disposed through its interior, the pipe being disposed through a pipe hole to extend to the crucible's lower portion, the pipe for blowing inert gas into the crucible's lower portion through the gas supply line;

(f) a guide tube disposed in the crucible's lower portion for discharging the molten metal;

(g) a cooling system for receiving the molten metal discharged through the guide tube, the cooling system being attached to the crucible's lower portion at a location where the molten metal is discharged through the guide tube;

(h) a third graphite filter disposed within the guide tube for increasing the degree of purity of the molten metal;

(i) an adiabatic material attached between the cooling system and the guide tube for preventing heat transfer; and (j) withdrawing rolls in which copper alloy passing through the cooling system undergoes horizontal continuous casting.

2. An apparatus according to claim 1, wherein said cooling system comprises:

(a) cooling fins disposed inside said cooling system in lattice form for increasing the cooling rate of phosphorized copper rod produced by the apparatus by increasing the contact area between coolant contained in the cooling system and the cooling fins;

(b) coolant entrances and exits disposed in three equidistant locations inside said cooling system for reducing the cooling rate by having the coolant circulate a shorter distance; and (c) rubber and copper alloy rings, which are installed within said cooling system, for sealing an interior space of said cooling system and preventing leakage of coolant.

3. The apparatus according to claim 1 wherein the crucible has a bottom and wherein the second graphite filter is disposed in the crucible's lower portion at the center of the crucible's bottom.

4. An apparatus according to claim 3, wherein said cooling system comprises:

(a) cooling fins disposed inside said cooling system in lattice form for increasing the cooling rate of phosphorized copper rod produced by the apparatus by increasing the contact area between coolant contained in the cooling system and the cooling fins;

(b) coolant entrances and exits disposed in three equidistant locations inside said cooling system for reducing the cooling rate by having the coolant circulate a shorter distance; and (c) rubber and copper alloy rings, which are installed within said cooling system, for sealing an interior space of said cooling system and preventing leakage of coolant.

* * * * *